Patented Apr. 25, 1933

1,905,222

UNITED STATES PATENT OFFICE

GEORGE H. ELLIS, OF ST. PAUL, MINNESOTA, ASSIGNOR TO THE INSULITE COMPANY, OF MINNEAPOLIS, MINNESOTA, A CORPORATION OF MINNESOTA

FIREPROOF BODIES AND PROCESS FOR MAKING THE SAME

No Drawing.  Application filed July 19, 1930.  Serial No. 469,249.

This invention relates to the methods for the production of substantially fire-proof, and water-resistant bodies, and to the bodies per se as articles of manufacture, as well as to a series of such bodies. One of the objects is to provide bodies which, although ignitable, will not continue to burn, except by the continued application of heat and which, on application of heat, will strongly resist ignition. The invention is partly based on the discovery that the addition of a protein-containing body to a woody pulped material, and the pressing and heating of the mixture, produces a substantially fire-resistant body which is also highly resistant to absorption of water.

The term "woody" as used herein, means vegetable material which contains any or all the constituents ordinarily found in trees or plants, and the roots, bark and leaves of the same. The term "cellulosic" as herein used also has substantially the same meaning.

In carrying out the invention wood pulp, either whole wood pulp or loaded pulp, preferably of coarse grade, is produced in any suitable way. The next step consists in mixing protein-containing material, such as cattle hair, chicken feathers, leather scraps, blood, with the "woody" pulp. Good results are obtained by mixing in proportions within the range of fifteen to forty per cent of the protein substance to weight of the finished product. The proportion range has been arrived at by extended experiment. The mixing can be accomplished in an ordinary beater. When dry hair is used, it is mixed with the pulp in the beater, and the beating operation is continued until a suitable shortening or hydration of hair and wood fiber takes place. This is an important feature. As a loading and fire-proofing material other substances having protein content may be used such as silk, gelatin, glue, albumen, globulin-proteins. The degree of beating partly determines the density of the final product, as also does the proportioning of the hair, or equivalent protein substance to the pulp.

The protein-containing pulp is then made into a sheet on a suitable felting machine. The wet sheet containing approximately seventy per cent of water is then delivered to a heated hydraulic (or equivalent) press and simultaneously submitted to pressures within the range of approximately four hundred to four hundred fifty pounds per square inch, at a press temperature within the range of from three hundred to four hundred degrees F. The application of heat and pressure is maintained from 25 to 40 minutes, producing a strong, tough, somewhat bendable board which is substantially fire-proof, and which is very moisture-resistant. If ignited by a Bunsen burner flame, burning of the product of this invention ceases very shortly after removal of burner heat. The board has substantially no after-glow. This prompt extinguishment takes place even under strong draft conditions.

An excellent strong, tough, somewhat bendable fire and moisture resistant body is produced by submitting the protein pulp mixture to a pressure of approximately 445 lbs. per square inch, at a temperature of 370° F., for about 30 minutes. This product has a tensile strength of 3400 lbs. per square inch and has a specific gravity of approximately 1.

In connection with the use of protein-containing bodies in the manner heretofore described, the following facts should be noted as bearing on the fire-proofing and water-proofing effects obtained by the practice of the invention, and discoveries herein: that the highly hydrated animal tissues are gels; that protein is capable of swelling in water (of talking up water) especially in the presence of a small quantity of acid or base; that protein (a very complex chemical substance) always contains carbon, hydrogen, oxygen, and nitrogen, and usually contains sulphur; that proteins when burning, give off gases which tend to exclude air (oxygen) from the more combustible portions of the synthetic product of this invention.

Apparently the fire-proofing action is largely due to the presence of protein substances, but it is also believed that the combination of this loading substance, or these loading substances, with pulp of "woody" nature, produces a new chemical combination and that the fire-proofing effects arise from both physical and chemical causes. Apparently the substances contained in the loading or fire-proofing materials, partly decomposes with the evolution of relatively great volumes of inert gases, which substantially prevent chemical combination with oxygen, or excludes oxygen and thus prevents continued combustion.

Another characteristic action of the product during pressing at high temperatures between the hot plates and under pressure, is the freeing of oily substances which lubricate the press plates and prevent sticking of the product thereto. This is an important feature. In pressing the ordinary type of mechanical pulp without the fire-proofing and water-proofing material disclosed herein, the board frequently cements itself or sticks to the surface of the polished press plates. This not only injures the product, but a considerable amount of time is required to disengage the board, and to re-polish the press plates.

It is believed that it is largely due to the action of heat on protein content of the various animal substances, which have been used (such as cattle hair, pig's hair, dried blood) that gases, or other substances, are given off which tend to prevent chemical combination of the more combustible "woody" fibers with air (oxygen). Hair, horns, nails, silk and gelatin or glue belong to the scleroproteins, which are contained in connective tissue. All are insoluble in water with the exception of glue and gelatin. Blood contains histone proteins, soluble in water, and which coagulate on heating, and also contains globulin proteins which are insoluble in water, but are soluble in saline solutions of moderate concentration. Blood also contains albumen which is soluble in water and coagulates on heating. Nitrogen content of the dried blood is from 9 to 12 per cent and that of hoofs and horns from 12 to 16 per cent. Human hair contains sulphur, nitrogen, carbon, hydrogen and oxygen.

It is also believed that the production of ammonia on the heating of the animal substances containing combined nitrogen, is partly responsible for the fire-proof quality of the product herein.

I claim as my invention:

1. A process for producing fire-resistant bodies, which have a tensile strength ranging from thirty-four hundred to four thousand pounds per square inch and a specific gravity of approximately one, which consists in adding a protein-containing body to a woody pulped material in proportion within the range of fifteen to forty per cent by weight of the finished product, mixing the resulting mass, forming a sheet, and then simultaneously pressing and heating the sheet to temperatures within the range of from three hundred to four hundred degrees Fahrenheit, and at pressures within the range of four hundred to four hundred fifty pounds per square inch, and maintaining heat and pressure from twenty-five to forty minutes.

2. A process for producing fire resistant bodies, which have a tensile strength ranging from thirty-four hundred to four thousand pounds per square inch and a specific gravity of approximately one, which consists in adding a protein-containing body to a woody pulped material, mixing the resulting mass, forming a sheet, and then simultaneously pressing and heating the sheet, to temperatures within the range of from three hundred to four hundred degrees Fahrenheit, and at pressures within the range of four hundred to four hundred fifty pounds per square inch, and maintaining heat and pressure from twenty-five to forty minutes.

3. A process for making a fire and moisture-resistant product which consists, in mixing cellulosic material with a protein-containing substance, forming a sheet, and pressing the sheet by the simultaneous application of heat and pressure, the pressure within a range of four hundred to four hundred fifty pounds per square inch, the heat within range of three hundred to four hundred degrees Fahrenheit, and with the pressure maintained over periods within the range of twenty-five to forty minutes, and the amount of protein being fifteen to forty per cent by weight of the finished product.

4. A process for producing a fire-resistant and waterproof body which consists, in mixing a protein-containing substance with woody material fiberized in the presence of water, forming a felted sheet containing approximately seventy per cent water, and then simultaneously pressing and heating the body in a manner to substantially reduce its thickness and to cause the exudation of oily substances at the surfaces.

5. A process for producing a fire-resistant and waterproof body which consists in mixing dried blood with woody material fiberized in the presence of water, forming a felted sheet containing approximately seventy per cent water, and then simultaneously pressing and heating the body in a manner to substantially reduce its thickness and to cause the exudation of oily substances at the surfaces.

6. A process for producing a fire resistant and water proof body which consists in mixing a protein-containing substance with woody material fiberized in the presence of water in proportion of fifteen to forty per cent of the protein-containing material to the weight of the finished product, forming the resultant substance into a felted sheet containing about seventy per cent of water and then simultaneously pressing and heating the body under a pressure of four hundred forty-five pounds per square inch at a temperature of three hundred seventy degrees Fahrenheit for thirty minutes.

7. A process for producing a fire resistant and water proof body which consists in mixing cattle hair with woody material fiberized in the presence of water in proportion of fifteen to forty per cent of the hair to the weight of the finished product, forming the resultant substance into a felted sheet containing about seventy per cent of water, and then simultaneously pressing and heating the body under a pressure of four hundred forty-five pounds per square inch at a temperature of three hundred seventy degrees Fahrenheit for thirty minutes.

8. A process for producing a fire resistant and water proof body which consists in mixing a protein-containing substance with woody material fiberized in the presence of water in proportion of fifteen to forty per cent of the protein-containing material to the weight of the finished product, forming the resultant substance into a felted sheet containing about seventy per cent of water and then simultaneously pressing and heating the body, the pressure ranging from four hundred to four hundred fifty pounds per square inch, and the temperature ranging from three hundred to four hundred degrees Fahrenheit, with the pressure maintained over periods within the range of twenty to forty minutes.

9. A process for producing a fire resistant and water proof body which consists in mixing cattle hair with woody material fiberized in the presence of water in proportion of fifteen to forty per cent of the hair to the weight of the finished product, forming the resultant substance into a felted sheet containing about seventy per cent of water and then simultaneously pressing and heating the body the pressure ranging from four hundred to four hundred fifty pounds per square inch at a temperature ranging from three hundred to four hundred degrees Fahrenheit with the pressure maintained over periods within the range of twenty to forty minutes.

In witness whereof, I have hereunto set my hand this 16th day of July 1930.

GEORGE H. ELLIS.